United States Patent
Nakanishi et al.

(10) Patent No.: US 6,808,848 B2
(45) Date of Patent: Oct. 26, 2004

(54) NONAQUEOUS ELECTROLYTE SECONDARY CELLS

(75) Inventors: Naoya Nakanishi, Tondabayashi (JP); Kouichi Satoh, Itami (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 159 days.

(21) Appl. No.: 09/963,463

(22) Filed: Sep. 27, 2001

(65) Prior Publication Data

US 2002/0061443 A1 May 23, 2002

(30) Foreign Application Priority Data

Sep. 29, 2000 (JP) ........................................ 2000-300708

(51) Int. Cl.⁷ ............................. H01M 4/50; H01M 4/52
(52) U.S. Cl. .................... 429/223; 429/224; 429/231.3; 429/231.1
(58) Field of Search ................................ 429/224, 223, 429/231.1, 231.3; 252/182.1

(56) References Cited

U.S. PATENT DOCUMENTS

| | | | | |
|---|---|---|---|---|
| 5,429,890 A | * | 7/1995 | Pynenburg et al. | ......... 429/310 |
| 5,783,333 A | | 7/1998 | Mayer | ......... 429/223 |
| 6,007,947 A | * | 12/1999 | Mayer | ......... 429/231.1 |
| 6,159,636 A | | 12/2000 | Wang et al. | ......... 429/223 |

FOREIGN PATENT DOCUMENTS

| | | |
|---|---|---|
| EP | 0 944 125 A1 | 9/1999 |
| EP | 1117145 A | 7/2001 |
| EP | 1 174 937 A1 | 1/2002 |
| JP | 3024636 B | 3/2000 |
| JP | 2000-77071 A | 3/2000 |
| JP | 2000-315503 A | 11/2000 |
| JP | 2002-100358 | * 4/2002 |
| WO | WO 00/13250 | * 3/2000 |

OTHER PUBLICATIONS

*Patent Abstracts of Japan*, vol. 1999, No. 11, JP 11 162466 A, Jun. 18, 1999.

* cited by examiner

*Primary Examiner*—Tracy Dove
(74) *Attorney, Agent, or Firm*—Kubovcik & Kubovcik

(57) ABSTRACT

Used as the positive electrode active substance of a lithium ion secondary cell is a mixture of a lithium-nickel-cobalt-manganese composite oxide represented by the formula $LiNi_{(1-x-y)}Co_xMn_yO_2$ wherein $0.5<x+y<1.0$ and $0.1<y<0.6$ and a lithium-manganese composite oxide represented by the formula $Li_{(1+z)}Mn_2O_4$ wherein $0 \leq z \leq 0.2$. The substance used gives outstanding power characteristics to the cell.

3 Claims, 3 Drawing Sheets

NONAQUEOUS ELECTROLYTE SECONDARY CELLS

FIELD OF THE INVENTION

The present invention relates to nonaqueous electrolyte secondary cells which comprise a rolled-up electrode unit accommodated in a closed container and serving as an electricity generating element and which are adapted to deliver electric power generated by the electrode unit to the outside.

BACKGROUND OF THE INVENTION

In recent years, attention has been directed to nonaqueous electrolyte secondary cells, such as lithium ion secondary cells, as cells having a high energy density. The lithium ion secondary cell comprises, as shown in FIGS. 1 and 2, a cylindrical closed container 1 having a cylinder 11 and lids 12, 12 welded to the respective ends of the cylinder, and a rolled-up electrode unit 4 enclosed in the container 1. A pair of positive and negative electrode terminal assemblies 9, 9 are attached to the lids 12, 12, respectively. Each electrode terminal assembly 9 and the rolled-up electrode unit 4 are interconnected by a current collector plate 32 and a lead portion 33 integral therewith, whereby the electric power generated by the electrode unit 4 can be delivered to the outside from the pair of terminal assemblies 9, 9. Each lid 12 is provided with a pressure-relief gas vent valve 13.

As shown in FIG. 3, the rolled-up electrode unit 4 comprises a positive electrode 41 and a negative electrode 43 which are each in the form of a strip and which are lapped over and displaced from each other with a separator 42 interposed therebetween and rolled up into a spiral form. The positive electrode 41 comprises a current collector 45 in the form of aluminum foil and coated with a positive electrode active substance 44. The negative electrode 43 comprises a current collector 47 in the form of copper foil and coated with a negative electrode active substance 46. The active substance 44 of the positive electrode 41 is opposed to the active substance 46 of the negative electrode 43 with the separator 42 interposed therebetween. The positive electrode active substance is a lithium-transition metal composite oxide, while the negative electrode active substance is metallic lithium, alloy for absorbing or desorbing lithium ions or carbon material.

In the charge-discharge reaction of the cell, lithium ions move between the positive electrode active substance 44 and the negative electrode active substance 46 which face each other with an electrolyte positioned therebetween. Stated more specifically, lithium ions migrate from the negative electrode active substance 46 toward the positive electrode active substance 44 and are inserted into the active substance 44 during discharging. During charging, on the other hand, lithium ions are released from the positive electrode active substance 44, migrate toward the negative electrode active substance 46 and are inserted into the active substance 46.

Useful positive electrode active substances are lithium-transition metal composite oxides such as lithium-cobalt composite oxide ($LiCoO_2$), lithium-nickel composite oxide ($LiNiO_2$) and lithium-manganese composite oxide ($LiMn_2O_4$). The use of the lithium-transition metal composite oxide as the positive electrode active substance provides a lithium ion secondary cell of four-volt class in discharge voltage and having a high energy density.

Of the lithium-transition metal composite oxides given above, lithium-manganese composite oxide ($LiMn_2O_4$) is most favorable with respect to the cost of material and stability of supply. However, this oxide is not widely used industrially partly because it is not as satisfactory as the other lithium-transition metal oxides, i.e., lithium-cobalt composite oxide ($LiCoO_2$) and lithium-nickel composite oxide ($LiNiO_2$), in charge-discharge characteristics, reducing markedly in cell capacity in the case where the cell is charged and discharged at increasing charge-discharge current values.

In order to prevent deterioration in preservation characteristics, i.e., a reduction in the cell capacity, when the cell is allowed to stand for a prolonged period of time without charging and discharging, and to prevent deterioration in life characteristics, i.e. a diminution in cell capacity, in the case where the cell is repeatedly charged and discharged, studies are underway on lithium ion secondary cells (Japanese Patent No. 3024636) wherein the positive electrode active substance is a mixture of lithium-manganese composite oxide ($LiMn_2O_4$) and a lithium-nickel composite oxide [$LiNi_{(1-x)}M_xO_2$ wherein $0<x\leq0.5$, and M is at least one metal element selected from the group consisting of Co, Mn, Al, Fe, Cu and Sr], and on the partial substitution of an element other than Mn for the Mn in lithium-manganese composite oxide ($LiMn_2O_4$).

Nonaqueous electrolyte secondary cells for use in electric vehicles are used under severe conditions involving repetitions of charging and discharging with a great current within a short period of time, and charge-discharge characteristics under such conditions need to be investigated. However, the research on and improvements in lithium ion secondary cells heretofore made are limited almost always to the preservation characteristics and life characteristics as stated above, and exhaustive research still remains to be made on charge-discharge characteristics under conditions involving repetitions of charging and discharging with a great current within a short period of time, i.e., power characteristics. We checked conventional lithium ion secondary cells wherein the positive electrode active substance used is lithium-manganese composite oxide, lithium-nickel composite oxide or a mixture thereof for the evaluation of power characteristics, but were unable to obtain satisfactory results.

SUMMARY OF THE INVENTION

An object of the present invention is to give improved power characteristics to lithium ion secondary cells wherein the positive electrode active substance used is a mixture of lithium-nickel-cobalt-manganese composite oxide and lithium-manganese composite oxide.

Accordingly, we have carried out intensive research to fulfill the above object and consequently found that the power characteristics of lithium ion secondary cells are greatly influenced by the composition of lithium-nickel-cobalt-manganese composite oxide, the composition of lithium-manganese composite oxide, the mixing ratio of these two kinds of composite oxides and the average diameter of particles of the two kinds of composite oxides to accomplish the present invention.

The present invention provides a lithium ion secondary cell wherein a positive electrode active substance comprises a mixture of a lithium-nickel-cobalt-manganese composite oxide represented by the formula $LiNi_{(1-x-y)}Co_xMn_yO_2$ wherein $0.5<x+y<1.0$ and $0.1<y<0.6$ and a lithium-manganese composite oxide represented by the formula $Li_{(1+z)}Mn_2O_4$ wherein $0\leq z\leq0.2$.

The positive electrode active substance of the lithium ion secondary cell embodying the present invention contains the lithium-nickel-cobalt-manganese composite oxide of the formula LiNi$_{(1-x-y)}$Co$_x$Mn$_y$O$_2$ wherein $0.5<x+y<1.0$ and $0.1<y<0.6$. Presumably, this component gives the active substance a structure permitting lithium ions to be readily inserted into and released from the active substance.

Further by mixing the lithium-nickel-cobalt-manganese composite oxide represented by the formula LiNi$_{(1-x-y)}$Co$_x$Mn$_y$O$_2$ wherein $0.5<x+y<1.0$ and $0.1<y<0.6$ with the lithium-manganese composite oxide represented by the formula Li$_{(1+z)}$Mn$_2$O$_4$ wherein $0 \leq z \leq 0.2$ and having a spinel structure, the particles of these oxides are held in contact with one another with good stability, presumably resulting in the ease of migration of electric charges in the case where the cell is repeatedly charged and discharged with a great current within a short period of time. It is therefore thought that the lithium ion secondary cell wherein the two kinds of composite oxides are used as the positive electrode substance exhibits outstanding power characteristics.

Stated more specifically, the lithium-nickel-cobalt-manganese composite oxide and the lithium-manganese composite oxide are mixed together in a ratio by weight of 20:80 to 80:20. Presumably, the mixing ratio of the oxides in this range ensures facilitated migration of electric charges between the particles of the composite oxides to result in excellent power characteristics.

Further stated more specifically, the lithium-nickel-cobalt-manganese composite oxide is in the form of particles having an average diameter of 1 to 15 µm, and the lithium-manganese composite oxide is in the form of particles having an average diameter of 5 to 15 µm. Presumably, this ensures ease of migration of charges between the particles of the composite oxides to result in excellent power characteristics.

Thus, the present invention provides a lithium ion secondary cell which is excellent in power characteristics.

DETAILED DESCRIPTION OF EMBODIMENT

Figure 1:
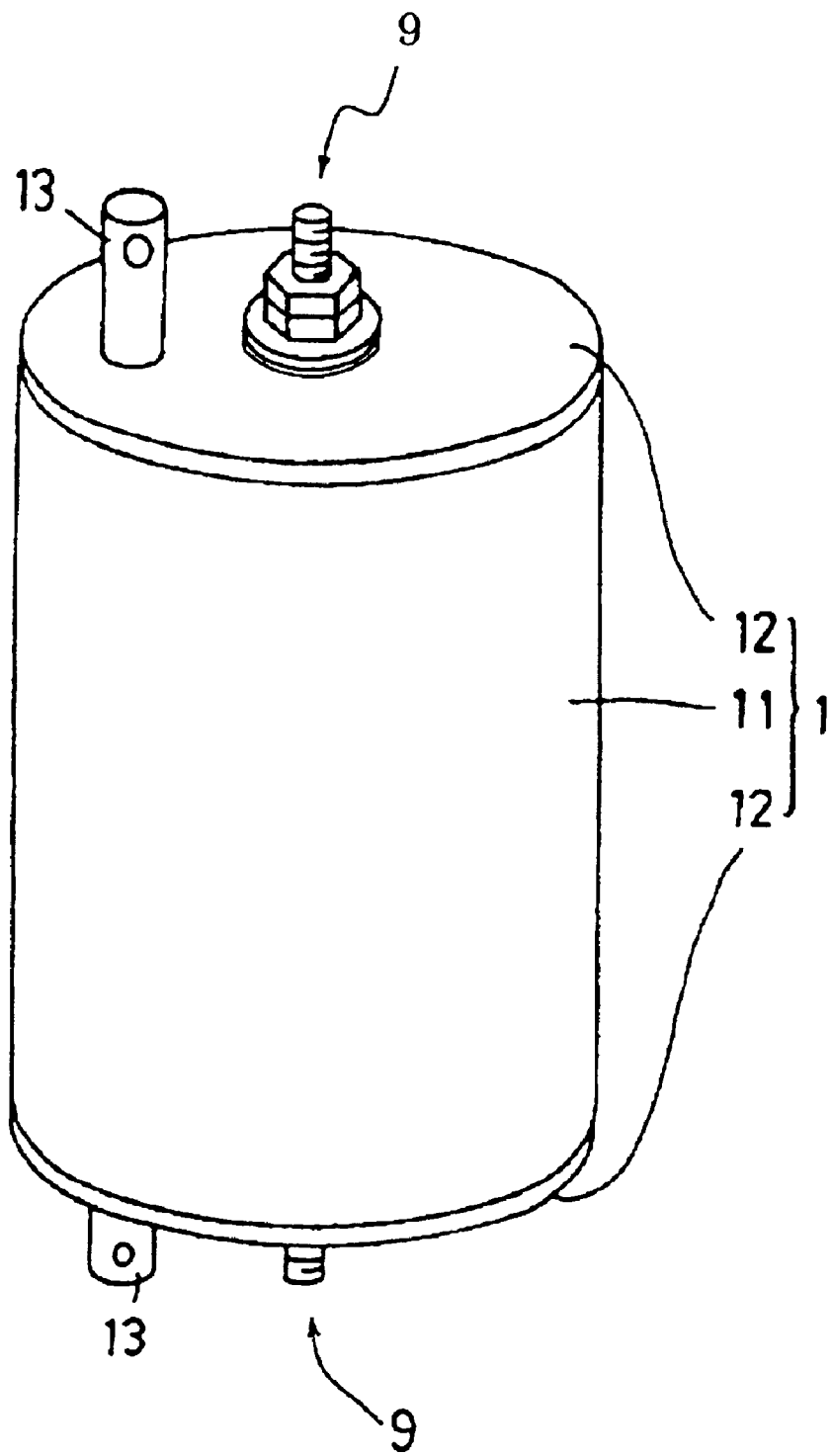
FIG. 1 is a perspective view showing the appearance of a conventional cell.

The present invention will be described below with reference to an embodiment thereof, i.e., a cylindrical lithium ion secondary cell. The lithium ion secondary cell of the invention has the same construction as the conventional lithium ion secondary cell shown in FIGS. 1 to 3, but is characterized in that the positive electrode active substance used is a mixture of a lithium-nickel-cobalt-manganese composite oxide represented by the formula LiNi$_{(1-x-y)}$Co$_x$Mn$_y$O$_2$ wherein $0.5<x+y<1.0$ and $0.1<y<0.6$ and a lithium-manganese composite oxide represented by the formula Li$_{(1+z)}$Mn$_2$O$_4$ wherein $0 \leq z \leq 0.2$.

In Example 1 given below, invention cells 0 to 12 were fabricated using lithium-nickel-cobalt-manganese composite oxides of different compositions. Fabricated in Example 2 were invention cells 13 to 18 using lithium manganate and a lithium-nickel-cobalt-manganese composite oxide in varying mixing ratios. Fabricated in Example 3 were invention cells 19 to 21 using lithium manganates of different compositions. Fabricated in Example 4 were invention cells 22 to 29 which were different in the average diameter of each of particulate lithium-nickel-cobalt-manganese composite oxide and lithium manganate used. The cells were tested for the evaluation of power characteristics.

EXAMPLE 1

Invention Cells 0–12

[Preparing Positive Electrodes 0–12]

A lithium-nickel-cobalt-manganese composite oxide represented by the formula LiNi$_{(1-x-y)}$Co$_x$Mn$_y$O$_2$ was prepared in the following manner.

First, nickel sulfate, cobalt sulfate and manganese sulfate were mixed together so that Ni, Co and Mn were in the mole ratios listed in Table 1 for positive electrodes 0 to 12. NaOH was added to an aqueous solution of each of these mixtures to obtain a hydroxide co-precipitate. The co-precipitate was then mixed with LiOH in a mole ratio of 1:1, and the mixture was then heat-treated in an oxygen atmosphere at 750 to 900° C. for 12 hours and thereafter pulverized to obtain oxide particles having an average diameter of 8 µm. Thus, a lithium-nickel-cobalt-manganese composite oxide was prepared.

Further LiMn$_2$O$_4$ having a spinel structure was prepared in the following manner. First, LiOH and manganese sulfate were mixed together so that Li and Mn were in a mole ratio of 1:2. The mixture was then heat-treated in the atmosphere at 800° C. for 20 hours to obtain LiMn$_2$O$_4$ of spinel structure. The oxide was pulverized to obtain particles with an average diameter of 7 µm.

For each of the positive electrodes 0 to 12, a positive electrode active substance was prepared by mixing the lithium-nickel-cobalt-manganese composite oxide of the composition listed in Table 1 and the oxide LiMn$_2$O$_4$ in the ratio by weight of 1:1. Ninety parts by weight of the powder of positive electrode active substance and 5 parts by weight of an artificial graphite powder were mixed with a solution of 5 parts by weight of polyvinylidene fluoride in N-methyl-2-pyrrolidone (NMP) to obtain a slurry. The slurry was applied to opposite surfaces of aluminum foil by the doctor blade method to form a layer of positive electrode active substance, followed by drying in a vacuum at 150° C. for 2 hours to prepare a positive electrode.

[Preparing Negative Electrodes]

Ninety-five parts by weight of natural graphite and a solution of 5 parts by weight of polyvinylidene fluoride in NMP were mixed together to obtain a slurry, which was then applied to opposite surfaces of copper foil by the doctor blade method to form a layer of negative electrode active substance, followed by drying in a vacuum at 150° C. for 2 hours to prepare a negative electrode.

[Preparing Rolled-up Electrode Units]

Figure 3:
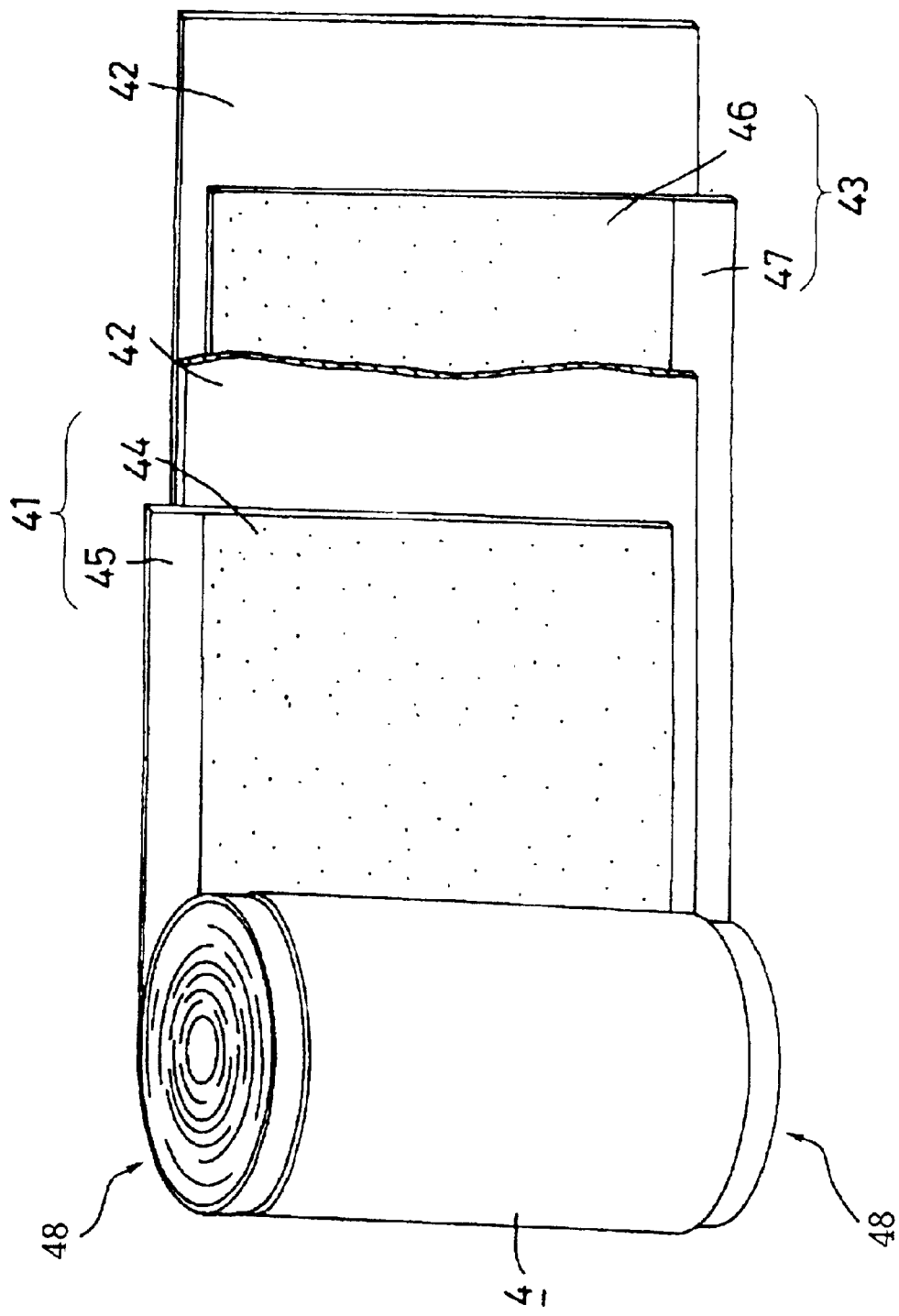
FIG. 3 is a perspective view partly in development and showing the construction of a rolled-up electrode unit in the conventional cell.

Rolled-up electrode units were prepared using the respective positive electrodes 0 to 12. The method of preparation was the same as in the prior art. With reference to FIG. 3, the positive electrode 41 and the negative electrode 43 were lapped over each other as displaced widthwise thereof from each other, with a separator 42 interposed therebetween, and the components were rolled up into a spiral form to obtain a rolled-up electrode unit 4. At one axial end 48 of the unit, one edge of the positive electrode 41 projected outward beyond the corresponding edges of the separators 42, while at the other end 48 thereof, the edge of the negative electrode 43 projected outward beyond the corresponding edges of the separators 42. The separator 42 was a porous membrane of polypropylene.

[Preparing Nonaqueous Electrolyte]

A nonaqueous electrolyte was prepared by dissolving 1 mole/liter of LiPF$_6$ in a solvent mixture of ethylene carbonate and dimethyl carbonate in a ratio by volume of 1:1.

[Assembling Cells]

Figure 2:
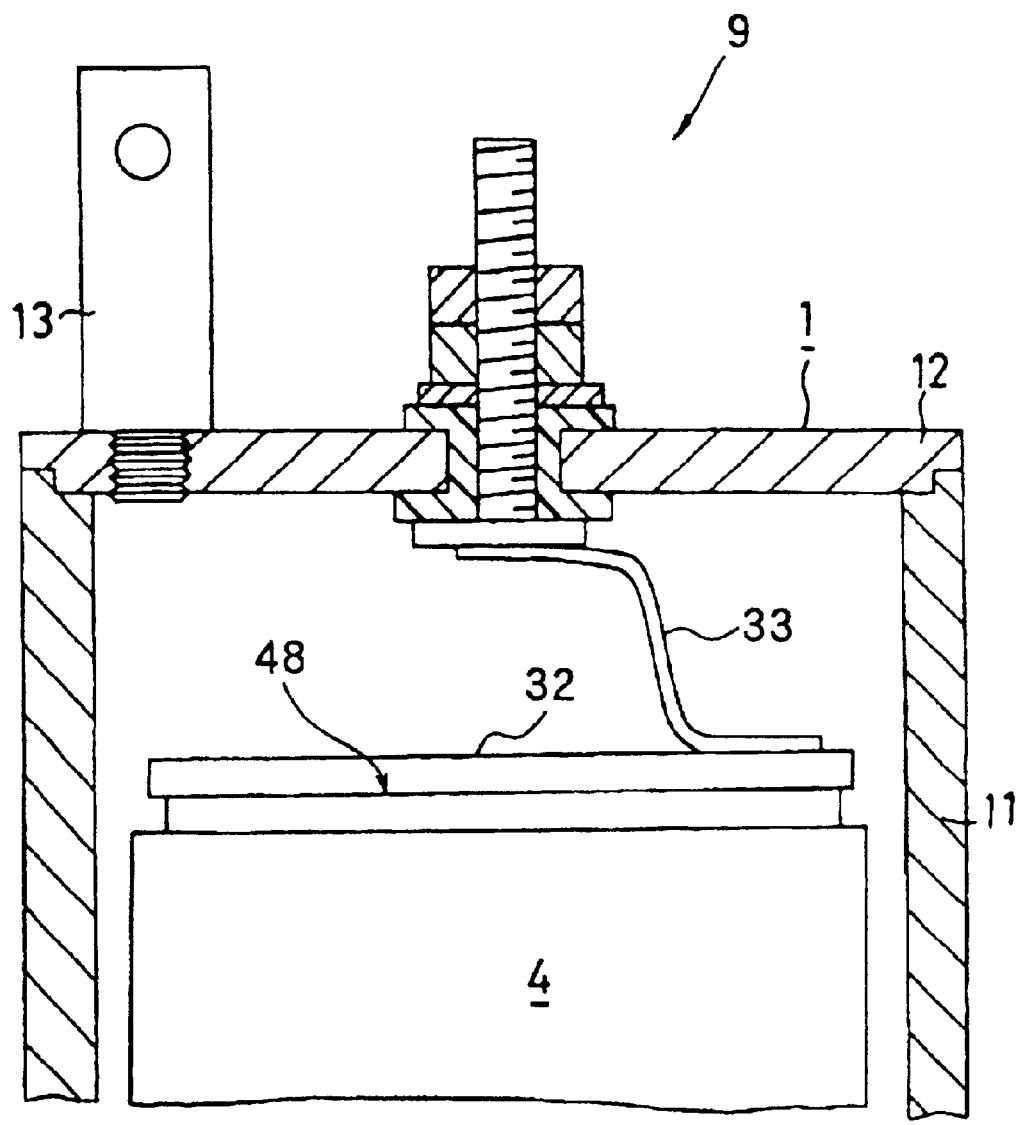
FIG. 2 is a view partly in section and showing a current collector structure in the conventional cell.

Lithium ion secondary cells were assembled using the respective rolled-up electrode units and the nonaqueous electrolyte. The assembling method was the same as conventionally. With reference to FIGS. 1 and 2, a current collector plate 32 was first joined to each end face 48 of the rolled-up electrode unit by welding. A lead portion 33 of the plate 32 was then joined to an electrode terminal assembly 9 attached to a lid 12. The electrode unit was thereafter placed into a cylinder 11, and the lid 12 was welded to the opening portion of the cylinder 11. Finally, the electrolyte was poured into the closed container 1 through an unillustrated liquid inlet. In this way, cylindrical invention cells 0 to 12, 40 mm in diameter and 100 mm in height, were completed.

Comparative Example 1

Comparative Cells 1–4

Comparative cells 1 to 4 were fabricated in the same manner as in Example 1 except that the Ni, Co and Mn in the lithium-nickel-cobalt-manganese composite oxide represented by the formula $LiNi_{(1-x-y)}Co_xMn_yO_2$ were in the mole ratios listed in Table 1 for respective positive electrodes 13 to 16.

TABLE 1

| Positive electrode (cell) | Nickel sulfate | Cobalt sulfate | Manganese sulfate |
|---|---|---|---|
| Positive electrode 0 (invention cell 0) | 0.4 | 0.4 | 0.2 |
| Positive electrode 1 (invention cell 1) | 0.1 | 0.6 | 0.3 |
| Positive electrode 2 (invention cell 2) | 0.2 | 0.5 | 0.3 |
| Positive electrode 3 (invention cell 3) | 0.3 | 0.4 | 0.3 |
| Positive electrode 4 (invention cell 4) | 0.4 | 0.3 | 0.3 |
| Positive electrode 5 (invention cell 5) | 0.1 | 0.5 | 0.4 |
| Positive electrode 6 (invention cell 6) | 0.2 | 0.4 | 0.4 |
| Positive electrode 7 (invention cell 7) | 0.3 | 0.3 | 0.4 |
| Positive electrode 8 (invention cell 8) | 0.4 | 0.2 | 0.4 |
| Positive electrode 9 (invention cell 9) | 0.1 | 0.4 | 0.5 |
| Positive electrode 10 (invention cell 10) | 0.2 | 0.3 | 0.5 |
| Positive electrode 11 (invention cell 11) | 0.3 | 0.2 | 0.5 |
| Positive electrode 12 (invention cell 12) | 0.4 | 0.1 | 0.5 |
| Positive electrode 13 (comparative cell 1) | 0.4 | 0.5 | 0.1 |
| Positive electrode 14 (comparative cell 2) | 0.5 | 0.2 | 0.3 |
| Positive electrode 15 (comparative cell 3) | 0.5 | 0.1 | 0.4 |
| Positive electrode 16 (comparative cell 4) | 0.2 | 0.2 | 0.6 |

EXAMPLE 2

Invention Cells 13–18

Invention cells 13 to 18 were fabricated in the same manner as in Example 1 except that the $LiNi_{0.4}Co_{0.3}Mn_{0.3}O_2$ and lithium manganate of spinel structure, $LiMn_2O_4$, which were used in Example 1 for the positive electrode 4 were used in the mixing ratios listed in Table 2 for the respective positive electrode active substances.

Comparative Example 2

Comparative Cells 5 and 6

Comparative cells 5 and 6 were fabricated in the same manner as in Example 2 except that the components were used in the mixing ratios given in Table 2 for the positive electrode active substances used.

TABLE 2

| Cell | Mixing ratio $LiNi_{0.4}Co_{0.3}Mn_{0.3}O_2/LiMn_2O_4$ |
|---|---|
| Invention cell 13 | 1/9 |
| Invention cell 14 | 2/8 |
| Invention cell 15 | 3/7 |
| Invention cell 16 | 7/3 |
| Invention cell 17 | 8/2 |
| Invention cell 18 | 9/1 |
| Comparative cell 5 | 0/10 |
| Comparative cell 6 | 10/0 |

EXAMPLE 3

Invention Cells 19–21

Invention cells 19 to 21 were fabricated in the same manner as in Example 1 except that the positive electrode active substances used were prepared by mixing together $LiNi_{0.4}Co_{0.3}Mn_{0.3}O_2$ and $Li_{(1+z)}Mn_2O_4$ wherein z is as listed in Table 3.

Comparative Example 3

Comparative Cell 7

Comparative cell 7 was fabricated in the same manner as in Example 3 with the exception of using $Li_{(1+z)}Mn_2O_4$ wherein z is the value listed in Table 3.

TABLE 3

| Cell | z $Li_{(1+z)}Mn_2O_4$ |
|---|---|
| Invention cell 19 | 0.05 |
| Invention cell 20 | 0.1 |
| Invention cell 21 | 0.2 |
| Comparative cell 7 | 0.21 |

EXAMPLE 4

Invention Cells 22–29

Invention cells 22 to 29 were fabricated in the same manner as in Example 1 except that the $LiNi_{0.4}Co_{0.3}Mn_{0.3}O_2$ and $LiMn_2O_4$ used in combination for each cell had the respective average diameters listed in Table 4.

TABLE 4

| Cell | $LiNi_{0.4}Co_{0.3}Mn_{0.3}O_2$ Average diameter ($\mu$m) | $LiMn_2O_4$ Av. diam. ($\mu$m) |
|---|---|---|
| Invention cell 22 | 1 | 7 |
| Invention cell 23 | 15 | 7 |
| Invention cell 24 | 8 | 5 |
| Invention cell 25 | 8 | 15 |
| Invention cell 26 | 0.5 | 7 |
| Invention cell 27 | 20 | 7 |
| Invention cell 28 | 8 | 4 |
| Invention cell 29 | 8 | 17 |

Comparative Example 4

Comparative Cells 8 and 9

In Comparative Example 5, comparative cells 8 and 9 were fabricated in the same manner as in Example 1 except that $LiMn_{1.95}Al_{0.05}O_4$ obtained by replacing the manganese atom in the lithium manganate of spinel structure partly with aluminum atom was used for the positive electrode active substance.

In fabricating the two cells, LiOH, manganese sulfate and aluminum sulfate were mixed together first so that Li, Mn and Al were in the mole ratio of 1:1.95:0.05. The mixture was then heat-treated in the atmosphere at 800° C. for 20 hours to obtain $LiMn_{1.95}Al_{0.05}O_4$ having a spinel structure. The oxide was further pulverized to prepare particles with an average diameter of 15 $\mu$m. Comparative cells 8 and 9 were fabricated in the same manner as in Example 1 using respective positive electrode active substances each prepared by mixing the lithium-nickel-cobalt-manganese composite oxide of the composition and average particle size listed in table 5 with the oxide $LiMn_{1.95}Al_{0.05}O_4$ in the ratio by weight of 1:1.

TABLE 5

| Cell | $LiNiCoMnO_2$ Comp. and av. diam. ($\mu$m) | $LiMn_{1.95}Al_{0.05}O_4$ Av. diam. ($\mu$m) |
|---|---|---|
| Comparative cell 8 | $LiNi_{0.6}Co_{0.3}Mn_{0.1}O_2$ 10 | 15 |
| Comparative cell 9 | $LiNi_{0.4}Co_{0.3}Mn_{0.3}O_2$ 8 | 15 |

Test (for Evaluation of Power Characteristics)

The cells thus fabricated were tested for power characteristics at a depth of discharge (DOD) of 50%. For the testing, each cell was first charged at 1.3 A to 4.2 V and then discharged at 2.15 A to 3.0 V to determine the cell capacity. The cell was subsequently charged at 1.3 A to 4.2 V and thereafter discharged at 2.15 A to DOD of 50%. The cell was then subjected to the following charge-discharge cycles simulating repetitions of charging and discharging with a great current for a short period of time to determine IV (current-voltage).

Charge-Discharge Cycles:

Charge at 6.5 A (10 sec)-cessation 5 min-discharge at 6.5 A (10 sec)-cessation 5 min-charge at 26 A (10 sec)-cessation 5 min-discharge at 26 A (10 sec)-cessation 5 min-charge at 52 A (10 sec)-cessation 5 min-discharge at 52 A (10 sec)

The relationship between the cell voltage and the cell current value determined after the cell was thereafter charged for 10 sec and discharged for 10 sec led to the following mathematic expression 1 wherein V is the cell voltage resulting from the 10-sec charging and 10-sec discharging, $V_0$ is initial cell voltage before the charge-discharge cycles, R is a slope (resistance) and I is the charging and discharging current.

(Mathematic Expression 1)

$$V = V_0 + R \times I$$

The charge-discharge characteristics of each cell after the charge-discharge cycles were evaluated in terms of the output power density and input power density calculated from the following mathematic expressions 2 and 3.

(Mathematic Expression 2)

Output power density=$[3 \times \{(3-V_0)/R\}]$/cell weight (Mathematic Expression 3)

Input power density=$[4.2 \times \{(4.2-V_0)/R\}]$/cell weight

Results

Tables 6 to 12 show the output power densities and input power densities of the cells determined by the test.

TABLE 6

| | Proportions | | | Output power density | Input power density |
|---|---|---|---|---|---|
| Cell | Ni | Co | Mn | (W/kg) | (W/kg) |
| Comparative cell 1 | 0.4 | 0.5 | 0.1 | 1824 | 1860 |
| Invention cell 0 | 0.4 | 0.4 | 0.2 | 1947 | 1945 |
| Invention cell 1 | 0.1 | 0.6 | 0.3 | 1943 | 1946 |
| Invention cell 2 | 0.2 | 0.5 | 0.3 | 1951 | 1950 |
| Invention cell 3 | 0.3 | 0.4 | 0.3 | 1949 | 1947 |
| Invention cell 4 | 0.4 | 0.3 | 0.3 | 1964 | 1954 |
| Comparative cell 2 | 0.5 | 0.2 | 0.3 | 1843 | 1875 |

TABLE 7

| | Proportions | | | Output power density | Input power density |
|---|---|---|---|---|---|
| Cell | Ni | Co | Mn | (W/kg) | (W/kg) |
| Invention cell 5 | 0.1 | 0.5 | 0.4 | 1961 | 1935 |
| Invention cell 6 | 0.2 | 0.4 | 0.4 | 1958 | 1940 |
| Invention cell 7 | 0.3 | 0.3 | 0.4 | 1953 | 1937 |
| Invention cell 8 | 0.4 | 0.2 | 0.4 | 1958 | 1941 |
| Comparative cell 3 | 0.5 | 0.1 | 0.4 | 1894 | 1888 |

TABLE 8

| | Proportions | | | Output power density | Input power density |
|---|---|---|---|---|---|
| Cell | Ni | Co | Mn | (W/kg) | (W/kg) |
| Invention cell 9 | 0.1 | 0.4 | 0.5 | 1974 | 1934 |
| Invention cell 10 | 0.2 | 0.3 | 0.5 | 1941 | 1931 |
| Invention cell 11 | 0.3 | 0.2 | 0.5 | 1960 | 1929 |
| Invention cell 12 | 0.4 | 0.1 | 0.5 | 1959 | 1934 |
| Comparative cell 4 | 0.2 | 0.2 | 0.6 | 1703 | 1640 |

TABLE 9

| Cell | Mixing ratio $LiNiCoMnO_2$//$LiMn_2O_4$ | Output power density (W/kg) | Input power density (W/kg) |
|---|---|---|---|
| Comparative cell 5 | 0/10 | 1804 | 1850 |
| Invention cell 13 | 1/9 | 1913 | 1911 |
| Invention cell 14 | 2/8 | 1965 | 1949 |
| Invention cell 15 | 3/7 | 1970 | 1950 |
| Invention cell 4 | 1/1 | 1964 | 1954 |
| Invention cell 16 | 7/3 | 1955 | 1960 |
| Invention cell 17 | 8/2 | 1940 | 1957 |
| Invention cell 18 | 9/1 | 1911 | 1909 |
| Comparative cell 6 | 10/0 | 1859 | 1899 |

TABLE 10

| Cell | Z $Li_{(1+z)}Mn_2O_4$ | Mixing ratio | Output power density (W/kg) | Input power density (W/kg) |
| --- | --- | --- | --- | --- |
| Invention cell 4 | 0 | 1/1 | 1964 | 1954 |
| Invention cell 19 | 0.05 | 1/1 | 1960 | 1952 |
| Invention cell 20 | 0.1 | 1/1 | 1955 | 1956 |
| Invention cell 21 | 0.2 | 1/1 | 1958 | 1945 |
| Comparative cell 7 | 0.21 | 1/1 | 1810 | 1811 |

TABLE 11

| Cell | $LiNi_{0.4}Co_{0.3}Mn_{0.3}O_2$ Av. diam. (μm) | $LiMn_2O_4$ Av. diam (μm) | Output power density (W/kg) | Input power density (W/kg) |
| --- | --- | --- | --- | --- |
| Invention cell 26 | 0.5 | 7 | 1919 | 1903 |
| Invention cell 22 | 1 | 7 | 1956 | 1951 |
| Invention cell 4 | 8 | 7 | 1964 | 1954 |
| Invention cell 23 | 15 | 7 | 1961 | 1955 |
| Invention cell 27 | 20 | 7 | 1902 | 1916 |
| Invention cell 28 | 8 | 4 | 1918 | 1910 |
| Invention cell 24 | 8 | 5 | 1945 | 1951 |
| Invention cell 4 | 8 | 7 | 1964 | 1954 |
| Invention cell 25 | 8 | 15 | 1960 | 1945 |
| Invention cell 29 | 8 | 17 | 1913 | 1916 |

TABLE 12

| Cell | $LiNiCoMnO_2$ Comp. and av. diam. | $LiMnO_4$ Comp. and av. diam. | Output power density (W/kg) | Input power density (W/kg) |
| --- | --- | --- | --- | --- |
| Comparative cell 8 | $LiNi_{0.6}Co_{0.3}Mn_{0.1}O_2$ 10 μm | $LiMn_{1.95}Al_{0.05}O_4$ 15 μm | 1812 | 1804 |
| Comparative cell 9 | $LiNi_{0.4}Co_{0.3}Mn_{0.3}O_2$ 8 μm | $LiMn_{1.95}Al_{0.05}O_4$ 15 μm | 1856 | 1854 |
| Invention cell 25 | $LiNi_{0.4}Co_{0.3}Mn_{0.3}O_2$ 8 μm | $LiMn_2O_4$ 15 μm | 1960 | 1945 |

Result 1
(Study on the composition of lithium-nickel-cobalt-manganese composite oxide)

The result shown in Tables 6 to 8 reveals that the cells of the invention wherein x and y in the formula $LiNi_{(1-x-y)}Co_xMn_yO_2$ are in the ranges of 0.5<x+y<1.0 and 0.1<y<0.6 exhibit satisfactory power characteristics. On the other hand, comparative cells 1 to 4 wherein both X and y are not in these ranges are inferior in power characteristics. Presumably, the reason is that since the composite oxide outside these ranges has an unstable crystal structure, it is difficult for lithium ions to be inserted into and released from the composite oxide at the interface between the electrode surface and the electrolyte in the charge-discharge reaction of short duration.

Result 2
(Study on the mixing ratio of lithium manganate and lithium-nickel-cobalt-manganese composite oxide)

The result given in Table 9 shows that the cells of the invention wherein the mixing ratio of lithium-nickel-cobalt-manganese composite oxide and lithium manganate is in the range of 20:80 to 80:20 exhibit satisfactory power characteristics. On the other hand, the cells wherein the ratio is outside this range are inferior in power characteristics. Presumably, the reason is that satisfactory conduction paths are formed between the particles of the mixture when the ratio is within the range.

Result 3
(Study on the composition of lithium manganate of spinel structure)

As will be apparent from the result in Table 10, the cells of the invention wherein the z in the formula $Li_{(1+z)}Mn_2O_4$ is in the range of 0≤z≤0.2 exhibit satisfactory power characteristics, whereas comparative cell 7 which is outside this range is inferior in power characteristics. Presumably the reason is that since the composite oxide which is outside the above range has an unstable crystal structure, it is difficult for lithium ions to be inserted into and released from the composite oxide at the interface between the electrode surface and the electrolyte in the charge-discharge reaction of short duration.

Result 4
(Study on the average diameter of particles of lithium-nickel-cobalt-manganese composite oxide and lithium manganate of spinel structure)

As will be apparent from the result given in Table 11, satisfactory power characteristics are exhibited by the cells of the invention wherein the lithium-nickel-cobalt-manganese composite oxide of the formula $LiNi_{0.4}Co_{0.3}Mn_{0.3}O_2$ is 1 to 15 μm in the average diameter of particles thereof and lithium manganate of the formula $LiMn_2O_4$ is 5 to 15 μm in the average diameter of particles thereof. On the other hand, the cells wherein the average diameters are outside the respective ranges are inferior in power characteristics. Presumably the reason is that satisfactory conduction paths are formed between the particles if the diameters are in the foregoing ranges.

Result 5
(Study on the partial substitution of Al element for the Mn element in lithium manganate of spinel structure)

The result given in Table 12 reveals that comparative cells 8 and 9 wherein the positive electrode active substance used contains $LiMn_{1.95}Al_{0.05}O_4$ obtained by replacing the manganese element in the lithium manganate of spinel structure partly with aluminum element are inferior to invention cell 25 in power characteristics. Presumably, the reason is that since $LiMn_{1.95}Al_{0.05}O_4$ has an unstable crystal structure, it is difficult for lithium ions to be inserted into and released from the composite oxide at the interface between the electrode surface and the electrolyte in the charge-discharge reaction of short duration.

The cell of the invention is not limited to the foregoing embodiment in construction but can be modified variously by one skilled in the art without departing from the spirit of the invention as set forth in the appended claims. For example, the structure for connecting the electrode terminal assembly to the rolled-up electrode unit is not limited to that shown in FIG. 2, but various known structures are usable.

What is claimed is:

1. A nonaqueous electrolyte secondary cell wherein a positive electrode active substance comprises a mixture of a lithium-nickel-cobalt-manganese composite oxide represented by the formula $LiNi_{(1-x-y)}Co_xMn_yO_2$, wherein 0.5<x+y<1.0, 0.1<x<0.6 and 0.2<y<0.5, and a lithium-manganese composite oxide represented by the formula $Li_{(1+z)}Mn_2O_4$ wherein 0≤z≤0.2.

2. A nonaqueous electrolyte secondary cell according to claim 1 wherein the mixing ratio by weight of the lithium-nickel-cobalt-manganese composite oxide and the lithium-manganese composite oxide is in the range of 20:80 to 80:20.

3. A nonaqueous electrolyte secondary cell according to claim 1 wherein the lithium-nickel-cobalt-manganese composite oxide is in the form of particles having an average diameter of 1 to 15 μm, and the lithium-manganese composite oxide is in the form of particles having an average diameter of 5 to 15 μm.

* * * * *